United States Patent
Asada et al.

(10) Patent No.: US 11,519,844 B2
(45) Date of Patent: Dec. 6, 2022

(54) CORROSION RESISTANCE TEST METHOD AND CORROSION RESISTANCE TEST APPARATUS FOR COATED METAL MATERIAL

(71) Applicant: MAZDA MOTOR CORPORATION, Hiroshima (JP)

(72) Inventors: Teruaki Asada, Hiroshima (JP); Tsutomu Shigenaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 403 days.

(21) Appl. No.: 16/635,160

(22) PCT Filed: Jul. 30, 2018

(86) PCT No.: PCT/JP2018/028447
§ 371 (c)(1),
(2) Date: Jan. 29, 2020

(87) PCT Pub. No.: WO2019/026843
PCT Pub. Date: Feb. 7, 2019

(65) Prior Publication Data
US 2021/0010926 A1    Jan. 14, 2021

(30) Foreign Application Priority Data
Aug. 4, 2017  (JP) ............................. JP2017-151600

(51) Int. Cl.
*G01N 17/02* (2006.01)
*G01N 17/00* (2006.01)

(52) U.S. Cl.
CPC ............. *G01N 17/02* (2013.01); *G01N 17/00* (2013.01)

(58) Field of Classification Search
CPC ....... G01N 17/02; G01N 17/04; G01N 17/006
(Continued)

(56) References Cited

U.S. PATENT DOCUMENTS

| | | | | |
|---|---|---|---|---|
| 4,294,667 A | * | 10/1981 | Yamamoto | A24B 9/00 204/404 |
| 5,519,330 A | * | 5/1996 | Yamauchi | G01N 17/02 324/71.2 |

(Continued)

FOREIGN PATENT DOCUMENTS

| | | | | |
|---|---|---|---|---|
| CA | 2822438 A1 | * | 6/2012 | ............. G01N 17/02 |
| CN | 108548775 A | * | 9/2018 | ............. G01N 17/02 |

(Continued)

OTHER PUBLICATIONS

English Translation of JP 5108844 B2. (Year: 2012).*
International Search Report issued in PCT/JP2018/028447; dated Oct. 30, 2018.

*Primary Examiner* — Jermele M Hollington
*Assistant Examiner* — Sean Curtis
(74) *Attorney, Agent, or Firm* — Studebaker & Brackett PC

(57) ABSTRACT

The method for a corrosion resistance test of a coated metal material is an electrochemical method simulating corrosion proceeded by damaged portions in the surface treatment film 4. Two artificially damaged portions 5 spaced from each other in a coated metal material 1 that is obtained by providing a surface treatment film 4 on a metal base 2 are electrically connected to each other by an external circuit 11 via an aqueous electrolyte material 6, and corrosion proceeds by supplying current using one of the artificially damaged portions 5 as an anode site and the other as a cathode site.

20 Claims, 9 Drawing Sheets

(58) Field of Classification Search
USPC .......................................... 204/404; 324/700
See application file for complete search history.

(56) References Cited

U.S. PATENT DOCUMENTS

| | | | | | |
|---|---|---|---|---|---|
| 6,033,554 | A | * | 3/2000 | Takeuchi | G01N 17/00 204/434 |
| 6,365,034 | B1 | * | 4/2002 | Spellane | G01N 17/02 205/775.5 |
| 8,906,212 | B2 | * | 12/2014 | Noro | G01N 17/02 205/777 |
| 9,476,820 | B2 | * | 10/2016 | Zhang | G01N 17/02 |
| 11,262,329 | B2 | * | 3/2022 | Asada | G01N 17/02 |
| 2011/0315550 | A1 | * | 12/2011 | Zhang | G01N 17/02 204/404 |
| 2014/0090987 | A1 | * | 4/2014 | Noro | G01N 17/02 204/404 |
| 2015/0060273 | A1 | * | 3/2015 | Zhang | G01N 27/02 204/404 |
| 2020/0182824 | A1 | * | 6/2020 | Asada | G01N 27/413 |
| 2020/0232905 | A1 | * | 7/2020 | Asada | G01N 17/006 |
| 2021/0010926 | A1 | * | 1/2021 | Asada | G01N 17/02 |
| 2021/0325295 | A1 | * | 10/2021 | Asada | G01N 17/02 |
| 2021/0395914 | A1 | * | 12/2021 | Asada | G01N 17/006 |
| 2021/0396648 | A1 | * | 12/2021 | Asada | G01N 17/02 |
| 2021/0396649 | A1 | * | 12/2021 | Asada | G01N 27/49 |
| 2021/0396650 | A1 | * | 12/2021 | Asada | G01N 27/4161 |
| 2022/0034786 | A1 | * | 2/2022 | Asada | G01N 17/002 |
| 2022/0099556 | A1 | * | 3/2022 | Asada | G01N 17/02 |
| 2022/0099557 | A1 | * | 3/2022 | Asada | G01N 17/02 |

FOREIGN PATENT DOCUMENTS

| | | | | | |
|---|---|---|---|---|---|
| CN | 111879695 | A | * | 11/2020 | |
| CN | 112147021 | A | * | 12/2020 | ............ C25D 11/00 |
| CN | 113588417 | A | * | 11/2021 | |
| CN | 110044810 | B | * | 12/2021 | |
| CN | 113777013 | A | * | 12/2021 | |
| EP | 591802 | A2 | * | 4/1994 | ............ B82Y 15/00 |
| EP | 2698623 | A1 | * | 2/2014 | ............ G01N 17/02 |
| EP | 3667293 | A1 | * | 6/2020 | ........... G01N 17/006 |
| EP | 3686575 | A1 | * | 7/2020 | ........... G01N 17/006 |
| EP | 3896428 | A1 | * | 10/2021 | ............ G01N 17/02 |
| EP | 3929562 | A2 | * | 12/2021 | ............ G01N 17/02 |
| EP | 3929563 | A1 | * | 12/2021 | ............ G01N 17/02 |
| EP | 3929564 | A1 | * | 12/2021 | ........... G01N 17/006 |
| EP | 3667293 | B1 | * | 2/2022 | ........... G01N 17/006 |
| EP | 3945303 | A2 | * | 2/2022 | ............ G01N 17/02 |
| FR | 2917519 | A1 | * | 12/2008 | ............ G01N 17/02 |
| GB | 2048491 | A | * | 12/1980 | ............ G01N 17/02 |
| JP | S59-48649 | A | | 3/1984 | |
| JP | H07-234202 | A | | 9/1995 | |
| JP | 3821004 | B2 | * | 9/2006 | |
| JP | 2007-271501 | A | | 10/2007 | |
| JP | 5108844 | B2 | * | 12/2012 | ............ G01N 17/02 |
| JP | 5108844 | B2 | | 12/2012 | |
| JP | 2015-059745 | A | | 3/2015 | |
| JP | 2016-050915 | A | | 4/2016 | |
| JP | 2016-050916 | A | | 4/2016 | |
| JP | 2019032172 | A | * | 2/2019 | |
| WO | WO-9747961 | A1 | * | 12/1997 | ............ G01N 17/00 |
| WO | WO-2012088335 | A2 | * | 6/2012 | ............ G01N 17/02 |
| WO | WO-2012141323 | A1 | * | 10/2012 | ............ G01N 17/02 |
| WO | WO-2019026843 | A1 | * | 2/2019 | ........... G01N 17/006 |

* cited by examiner

FIG. 2

| SAMPLE | ELECTRODEPOSITION CHEMICAL CONVERSION BAKING CONDITION | ANODE SITE APPEARANCE PHOTOGRAPH | CATHODE SITE APPEARANCE PHOTOGRAPH (BEFORE PEELING) | CATHODE SITE APPEARANCE PHOTOGRAPH (AFTER PEELING) | CORROSION PROGRESSION RATE | ACTUAL CORROSION TEST CORROSION PROGRESSION RATE |
|---|---|---|---|---|---|---|
| 1 | 140°C × 15min / 120sec | | | | 1.4mm/hour | 0.44mm/day |
| 2 | 140°C × 20min / 10sec | | | | 2.0mm/hour | 0.60mm/day |
| 3 | 140°C × 20min / 30sec | | | | 0.9mm/hour | 0.27mm/day |

FIG.3

| SAMPLE | ELECTRODEPOSITION BAKING CONDITION | ELECTROCHEMICAL CONVERSION TIME | ANODE SITE — APPEARANCE PHOTOGRAPH | CATHODE SITE | | CORROSION PROGRESSION RATE | ACTUAL CORROSION TEST CORROSION PROGRESSION RATE |
|---|---|---|---|---|---|---|---|
| | | | | APPEARANCE PHOTOGRAPH (BEFORE PEELING) | APPEARANCE PHOTOGRAPH (AFTER PEELING) | | |
| 4 | 140°C × 20min | 120sec | | | | 1.1mm/hour | 0.30mm/day |
| 5 | 150°C × 20min | 30sec | | | | 0.6mm/hour | 0.18mm/day |
| 6 | 150°C × 20min | 12sec | | | | 0.4mm/hour | 0.10mm/day |

FIG.5

| DEPOSIT ON COATING FILM | EXPOSURE ENVIRONMENT | ELECTRODE POSITION BAKING CONDITION | THICKNESS OF ELECTRODE POSITION COATING FILM (μm) | ABSORBED WATER AMOUNT μ gmm⁻³ (AFTER 9 DAYS) | EXPANSION OCCURRENCE RATE (%) (AFTER 9 DAYS) | APPEARANCE (AFTER 9 DAYS) |
|---|---|---|---|---|---|---|
| WATER | 50°C, 98% | 150°C × 20min | 10 | 18.9 | 0.1 | |
| 5% NaCl (SPRAY) | | | | 29.8 | 0.7 | |
| 5% CaCl (SPRAY) | | | | 22.6 | 0.4 | |

FIG.6

| DEPOSIT ON COATING FILM | EXPOSURE ENVIRONMENT | ELECTRODE POSITION BAKING CONDITION | THICKNESS OF ELECTRODE POSITION COATING FILM (μm) | ABSORBED WATER AMOUNT μgmm$^{-3}$ (AFTER 9 DAYS) | EXPANSION OCCURRENCE RATE (%) (AFTER 9 DAYS) | APPEARANCE (AFTER 9 DAYS) |
|---|---|---|---|---|---|---|
| PSEUDO MUD | 50°C, 98% | 140°C × 15min | 10 | 1150.2 | 40 | |
| | | 140°C × 20min | 10 | 1372.9 | 50 | |
| | | 150°C × 20min | 15 | 248.8 | 5.8 | |
| | | | 15 | 63.2 | 4.8 | |

FIG. 7

| DEPOSIT ON COATING FILM | EXPOSURE ENVIRONMENT | ELECTRODE POSITION BAKING CONDITION | THICKNESS OF ELECTRODE POSITION COATING FILM (μm) | ABSORBED WATER AMOUNT μg mm⁻³ (AFTER 9 DAYS) | EXPANSION OCCURRENCE RATE (%) (AFTER 9 DAYS) | APPEARANCE (AFTER 9 DAYS) |
|---|---|---|---|---|---|---|
| 5% NaCl (IMMERSION) | 50°C | 140°C × 15min | | 223.5 | 13.5 | |
| | | 140°C × 20min | 10 | 81.4 | 7.3 | |
| | | 150°C × 20min | | 47.7 | 3.5 | |
| | | | 15 | 27.5 | 3 | |

CORROSION RESISTANCE TEST METHOD AND CORROSION RESISTANCE TEST APPARATUS FOR COATED METAL MATERIAL

TECHNICAL FIELD

The present invention relates to a method for a corrosion resistance test of and a corrosion resistance test apparatus for a coated metal material.

BACKGROUND ART

As a technique for evaluating the performance of coating films, the accelerated corrosion test such as a combined cycle test and a salt spray test has been performed.

The accelerated corrosion test requires several months for evaluation. It is thus difficult to simply evaluate, for example, the film quality of the coating film to be coated on steel sheets made of different components or made under different baking conditions and to rapidly optimize coating conditions. Thus, in the material development, the process control in coating factories, and the quality control relating to the rust prevention for vehicles, it is desired to establish a quantitative evaluation method for rapidly and simply evaluating corrosion resistance of coated steel sheets.

In response to the desire, Patent Document 1 describes, as a technique for evaluating corrosion resistance of a coating applied to the surface of a metal member, a method in which a metal member having this coating and a counter electrode member are immersed in water or an electrolyte solution, the metal member is then electrically connected to a negative terminal side of a power supply for measurement, the counter electrode member is electrically connected to a positive terminal side of the power supply, and the anti-corrosive performance of the coating is evaluated on the basis of the oxygen diffusion-limited current flowing from the counter electrode member to the metal member through the coating.

Patent Document 2 indicates that an electrode is disposed on a coating film surface side of a coated metal material via an electrolyte material, voltage is applied to between a base of the coated metal material and the surface of the coating film, and corrosion resistance of the coated metal material is evaluated on the basis of the current value at the time when electrical breakdown of the coating film occurs.

Patent Document 3 indicates that an electrode is disposed on a coating film surface side of a coated metal material via an electrolyte material, an electrolyte material is permeated into the coating film on the coated metal material, a voltage is applied to between a base of the coated metal material and the surface of the coating film, and corrosion resistance of the coated metal material is evaluated on the basis of the value of the current flowing with application of the voltage.

CITATION LIST

Patent Documents

Patent Document 1: Japanese Unexamined Patent Publication No. 2007-271501
Patent Document 2: Japanese Unexamined Patent Publication No. 2016-50915
Patent Document 3: Japanese Unexamined Patent Publication No. 2016-50916

SUMMARY OF THE INVENTION

Technical Problem

Although the corrosion resistance of the coated metal material can be evaluated by the methods for a corrosion resistance test described in Patent Documents 1-3, it is required to establish a corrosion resistance test by which evaluation results with higher reliability can be obtained. In particular, corrosion proceeds by a damaged portion in the surface treatment film of the metal base in many cases. However, there has been no report about a simple and reliable electrochemical corrosion resistance test simulating such corrosion.

An object of the present invention is to provide a method and apparatus for the electrochemical corrosion resistance test.

Solution to the Problem

A corrosion model has been known in which metal corrosion proceeds through an anode reaction (oxidation) of generating free electrons by melting (ionizing) metal in contact with water and a cathode reaction (reduction) of generating a hydroxyl group $OH^-$ from dissolved oxygen in water by the free electrons occurred in parallel.

Hence, in the present invention, an anode site and a cathode site are artificially formed in a coated metal material to accelerate corrosion.

A method for a corrosion resistance test disclosed herein is for a coated metal material obtained by providing a metal base with a surface treatment film and includes:
forming two artificially damaged portions penetrating the surface treatment film to the metal base in the coated metal material so as to be spaced from each other;
electrically connecting the artificially damaged portions to each other by an external circuit via an aqueous electrolyte material in contact with the artificially damaged portions; and
supplying current to the metal base through the external circuit using one of the artificially damaged portions as an anode site and the other as a cathode site so as to proceed corrosion of the coated metal material.

A corrosion resistance test apparatus for a coated metal material obtained by coating a metal base with a surface treatment film includes:
an external circuit that connects two artificially damaged portions penetrating the surface treatment film to the metal base, the artificially damaged portions being formed in the coated metal material so as to be spaced from each other via an aqueous electrolyte material in contact with the artificially damaged portions; and
a current supplier that supplies current to the metal base through the external circuit using one of the artificially damaged portions as an anode site and the other as a cathode site so as to proceed corrosion of the coated metal material.

In the corrosion resistance test according to the above-described method or apparatus, one of the artificially damaged portions in the coated metal material is an anode site at which an elusion (oxidation) of metal in the metal base occurs. The other artificially damaged portion into which the electrons generated at the anode site flow through the metal base is a cathode site at which reduction occurs by the electrons.

At the anode site, the eluted metal ions are attracted to an electrode (negative electrode) and react with dissolved oxygen in the aqueous electrolyte material or $OH^-$ generated by electrolysis of water at the electrode (negative electrode) to form iron hydroxide. At the anode site, electrons are supplied. Thus, due to the same principle as the electric anti-corrosion, corrosion of the coated metal material does not proceed, although metal in the metal base is ionized and a certain amount of ions are then dissolved in the aqueous electrolyte material.

On the other hand, at the cathode site, electrons flowing from the anode site via the metal base react with water and dissolved oxygen permeating in the surface treatment film and ionized $H^+$ in water to generate hydrogen and $OH^-$. Further, hydrogen is also generated by electrolysis of water. As a result, the pH of a portion below the surface treatment film is increased, and corrosion of the coated metal material proceeds.

The generation of $OH^-$ at the cathode site corresponds to the cathode reaction in the corrosion model mentioned above. Thus, the corrosion resistance test can be said to be a reproduction of actual corrosion of the coated metal material in an accelerated manner by supplying current to the metal base through the external circuit.

At the cathode site of the two artificially damaged portions, an underlayer treated surface (chemically converted surface) of the metal base is damaged by alkalization (generation of $OH^-$.) Thus, adhesion of the surface treatment film is reduced (in the case of conducting no underlayer treatment, adhesion between the metal base and the surface treatment film is simply reduced), and the surface treatment film is expanded. Further, hydrogen gas generated by electrolysis of water and reduction of $H^+$ accelerate the expansion of the surface treatment film. Accordingly, by examining the degree of the expansion of this surface treatment film, the corrosion progression rate of a sample in the corrosion resistance test can be determined.

As will be described in detail later based on experimental data, since the corrosion resistance test reproduces actual corrosion in an accelerated manner as mentioned above, data of the corrosion progression rate to be obtained highly correlates with the actual corrosion progression rate. Accordingly, corrosion resistance of the sample can be evaluated with high reliability on the basis of the data of the corrosion progression rate.

As the aqueous electrolyte material, any of various kinds of materials can be employed. In one embodiment, the aqueous electrolyte material is a muddy material and is provided on faces of the surface treatment film at the artificially damaged portions. When the aqueous electrolyte material is in a muddy state, water easily permeates into the surface treatment film at the artificially damaged portions, so that the corrosion tends to proceed. Further, the aqueous electrolyte material, if it is in a muddy state, can be provided on faces of the surface treatment film even when the surface treatment film is not flat.

The aqueous electrolyte material can be formed into a muddy material by employing a clay mineral as an additive. As the clay mineral, a layered silicate mineral or zeolite can be employed, for example. As the layered silicate mineral, at least one selected from kaolinite, montmorillonite, sericite, illite, glauconite, chlorite, and talc can be preferably employed. As a supporting electrolyte (salt), at least one salt selected from sodium chloride, sodium sulfate, calcium chloride, calcium phosphate, potassium chloride, potassium nitrate, potassium hydrogen tartrate, and magnesium sulfate can be preferably employed. The aqueous electrolyte material may contain an organic solvent (acetone, ethanol, toluene, methanol, or the like).

The content of the clay mineral in the aqueous electrolyte material is preferably from 1 mass % to 70 mass %. The content is preferably from 10 mass % to 50 mass % and more preferably from 20 mass % to 40 mass %.

The content of the supporting electrolyte in the aqueous electrolyte material is preferably from 1 mass % to 20 mass %. The content is preferably from 3 mass % to 15 mass % and more preferably from 5 mass % to 10 mass %.

The content of the organic solvent in the aqueous electrolyte material is preferably from 5% to 60% in terms of volume ratio with respect to water. The volume ratio is preferably from 10% to 40% and more preferably from 20% to 30%.

In order to supply current to the metal base, electrodes at both ends of the external circuit can be buried in the aqueous electrolyte material. As such electrodes, a carbon electrode, a platinum electrode, and the like can be used. Specifically, perforated electrodes each having at least one through hole corresponding to the surface treatment film can be employed and are disposed preferably to be substantially parallel with the surface treatment film. For example, each perforated electrode is formed in a ring shape having a through hole at the center thereof and is provided so that the through hole faces each artificially damaged portion. Alternatively, a mesh electrode may be employed as the perforated electrode. The mesh electrode may be disposed to be substantially parallel with the surface treatment film in a state in which the mesh electrode is buried in the aqueous electrolyte material.

Each artificially damaged portion may be in any form such as a damaged portion, a puncture, or a scratch, as long as it penetrates the surface treatment film to a metal base.

As to the size of the artificially damaged portion at the cathode site, the smaller an exposed area of the metal base in the surface treatment film is, the lower the conductivity becomes, and the cathode reaction tends to be difficult to proceed. On the other hand, as the exposed area becomes larger, the cathode reaction becomes unstable, and the accelerated reproducibility of corrosion is deteriorated. On the basis of experiments, the exposed area of the metal base, formed by the artificially damaged portion, is preferably from $0.005$ $mm^2$ to $25$ $mm^2$, more preferably from $0.05$ $mm^2$ to $4$ $mm^2$, and still more preferably from $0.13$ $mm^2$ to $2.25$ $mm^2$.

The distance between the two artificially damaged portions is preferably 2 cm or more and more preferably 3 cm or more in order to easily observe expansion of the surface treatment film at the cathode site.

As to a value of the current supplied through the external circuit, as the current value becomes lower, acceleration of corrosion is deteriorated, and the time required for the test becomes longer. On the other hand, as the current value becomes higher, the corrosion reaction rate becomes unstable, and correlation with proceeding of actual corrosion is deteriorated. On the basis of experiments, the current value is preferably from 10 µA to 10 mA, and more preferably from 100 µA to 5 mA or from 500 µA to 2 mA.

Examples of the coated metal material suitable for applying to the corrosion resistance test include a coated metal material obtained by providing, as a surface treatment film, a resin coating, i.e., a coating film on a metal base.

The metal base may be, for example, a steel material for forming an electric household appliance, a building material, or an automobile part, such as a steel plate cold commercial (SPCC), a galvanized alloy steel sheet (GA), a high-tensile strength steel sheet, or a hot stamping material, or may be a light alloy material. A chemical conversion coating (a phosphate coating (for example, a zinc phosphate coating), a chromate coating, or the like) may be formed on a surface of the metal base.

The coating film includes, for example, an epoxy resin-based or acrylic resin-based cationic electrodeposition coating film (undercoat film) and may be a multilayered coating film obtained by overlaying a topcoat film on an electrodeposition coating film or by overlaying a surfacer film and a topcoat film on an electrodeposition coating film.

Advantages of the Invention

In the present invention, two artificially damaged portions spaced from each other in the coated metal material are electrically connected to each other by the external circuit via an aqueous electrolyte material, and current is supplied using one of the artificially damaged portions as an anode site and the other as a cathode site to proceed corrosion. Thus, the present corrosion resistance test can reproduce actual corrosion of the coated metal material in an accelerated manner and can evaluate corrosion resistance with high reliability.

BRIEF DESCRIPTION OF THE DRAWINGS

FIG. 2 is a chart indicating treatment conditions and results of corrosion resistance test of samples 1 to 3.

FIG. 3 is a chart indicating treatment conditions and results of corrosion resistance test of samples 4 to 6.

FIG. 5 is a chart illustrating the amount of water absorbed in a coating film and the expansion occurrence rate of the coating film in each of the cases in which the respective deposits on the coating film are water, 5% NaCl (spray), and 5% CaCl (spray).

FIG. 6 is a chart indicating the amount of water absorbed in a coating film and the expansion occurrence rate of the coating film in the case in which a deposit on the coating film is pseudo mud.

FIG. 7 is a chart indicating the amount of water absorbed in a coating film and the expansion occurrence rate in the case in which a deposit on the coating film is 5% NaCl (immersion).

DESCRIPTION OF EMBODIMENT

An embodiment of the present invention will be described below with reference to the drawings. The following description of a preferred embodiment is merely illustrative in nature and is not intended to limit the present invention and applications or uses thereof.

Figure 1:
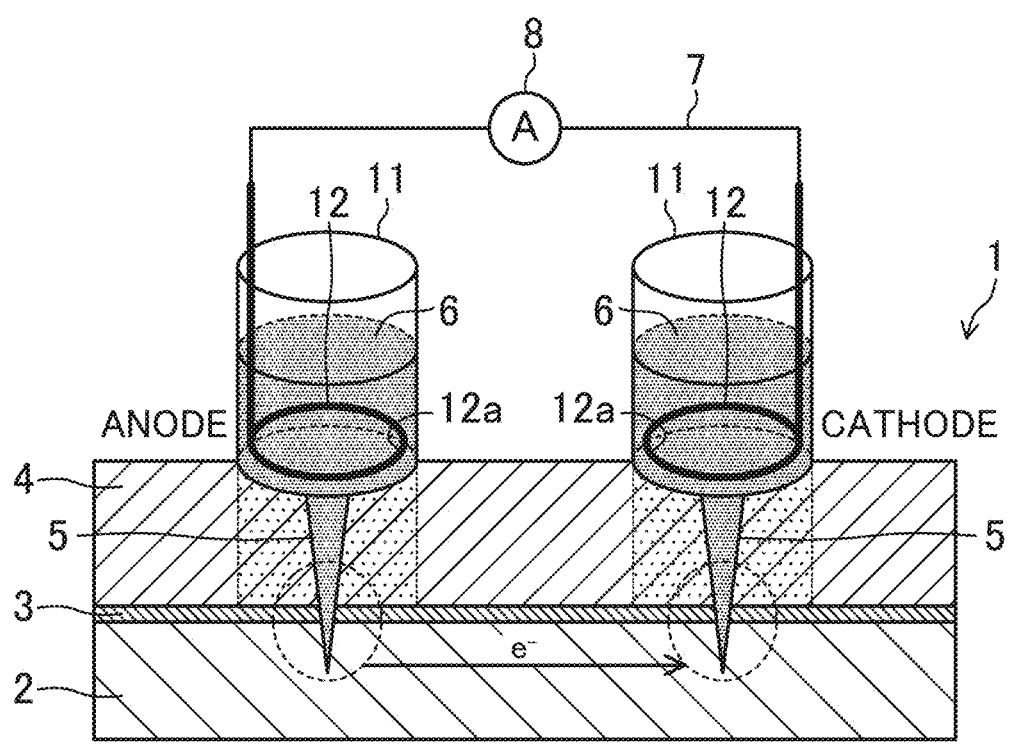
FIG. 1 is a drawing illustrating a principle of a corrosion resistance test according to the present embodiment.

FIG. 1 illustrates a principle of a corrosion test. In FIG. 1, the reference numeral 1 denotes a coated metal material. In the coated metal material 1 according to the present embodiment, a chemical conversion coating 3 is formed on a steel plate 2 serving as a metal base, and a resin coating film serving as a surface treatment film, i.e., an electrodeposition coating film 4 in the present embodiment is formed on the steel plate 2.

Two artificially damaged portions 5 penetrating the electrodeposition coating film 4 and the chemical conversion coating 3 to the steel plate 2 are formed in the coated metal material 1 so as to be spaced from each other.

(Corrosion Resistance Test Apparatus)

The corrosion resistance test apparatus according to the present embodiment includes an external circuit 7 electrically connecting the two artificially damaged portions 5 in the coated metal material 1 via an aqueous electrolyte material 6 serving as a conductive material, and a direct constant current source 8 serving as a current supplier that supplies current to the steel plate 2 through the external circuit 7.

At the two artificially damaged portions in the coated metal material 1, cylindrical members 11 each having a larger diameter than each artificially damaged portion 5 are formed to be concentric with the respective artificially damaged portions 5. The aqueous electrolyte material 6 is placed in the cylindrical members 11 to be in contact with faces of the electrodeposition coating film 4 and enter the artificially damaged portions 5. Electrodes 12 are provided on both ends of the external circuit 7 and are buried in the aqueous electrolyte material 6 inside the cylindrical members 11.

The aqueous electrolyte material 6 is a muddy material containing water, a clay mineral, and a supporting electrolyte. In the present embodiment, kaolinite which is a layered silicate mineral is employed as the clay mineral, and three kinds of supporting electrolyte, i.e., sodium chloride, sodium sulfate, and calcium chloride, are employed as the supporting electrolyte. In the aqueous electrolyte material 6, the content of the clay mineral is preferably from 1 mass % to 70 mass %, and the content of the supporting electrolyte is preferably from 1 mass % to 20 mass %.

Each electrode 12 is a ring-shaped perforated electrode having a through hole 12a at the center thereof and is disposed to be parallel with the electrodeposition coating film 4 such that the through hole 12a faces each artificially damaged portion 5 and is concentric with the artificially damaged portion 5.

As the constant current source 8, galvanostat can be employed for example, and the current value thereof is controlled to be from 10 μA to 10 mA.

(Method for Corrosion Resistance Test)

A method for a corrosion resistance test of a coated metal material 1 using the corrosion resistance test apparatus is described in order of processes.

Process of Forming Artificially Damaged Portion

Two artificially damaged portions 5 penetrating the surface treatment film (the electrodeposition coating film 4 and the chemical conversion coating 3) to the steel plate 2 are formed in the coated metal material 1 so as to be spaced from each other. The exposed area of the steel plate 2 by each artificially damaged portion 5 may be from 0.005 mm$^2$ to 25 mm$^2$. There is no particular limitation on the type of the tool for forming the artificially damaged portions. For example, the artificially damaged portions 5 are preferably formed by an indenter with a predetermined load using a Vickers hardness tester in order not to vary the size and depth of the artificially damaged portions 5, i.e., in order to form artificially damaged portions 5 quantitatively. The distance between the artificially damaged portions 5 is preferably 2 cm or more, more preferably 3 cm or more.

When artificially damaged portions are formed by an indenter, the tip shape of the indenter is not limited to a quadrangular pyramid such as an indenter of the Vickers hardness tester to be described later, and various shapes having an appropriate diameter such as a spherical shape may be employed.

Process of Connecting External Circuit

Cylindrical members 11 surrounding the respective two artificially damaged portions 5 are placed on the electrodeposition coating film 4 of the coated metal material 1, and a predetermined amount of a muddy aqueous electrolyte material 6 is placed in the cylindrical members 11. At this time, ring-shaped perforated electrodes 12 in the external circuit 7 including a constant current source 8 are buried in the aqueous electrolyte material 6. It is preferred that the cylindrical members 11 are provided to be concentric with the respective artificially damaged portions 5. It is preferred that each perforated electrode 12 is provided to be parallel with the surface of the electrodeposition coating film 4 and to be concentric with each artificially damaged portion 5.

In the above-described manner, the aqueous electrolyte material 6 contained in each cylindrical member 11 is in contact with the surface of the electrodeposition coating film 4 and enters each artificially damaged portion 5. Then, the artificially damaged portions are electrically connected to each other by an external circuit 7 via the aqueous electrolyte material 6 in contact with the artificially damaged portions.

Process of Supplying Current

The constant current source 8 is actuated to supply current to the steel plate 2 of the coated metal material 1 through the external circuit 7 via the perforated electrodes 12, the aqueous electrolyte materials 6, and the electrodeposition coating film 4. It is preferred that the current supply is controlled so that the current will be a constant current from 10 µA to 10 mA.

By this current supply, electrons $e^-$ flow from the aqueous electrolyte material 6 to the steel plate 2 at one of the artificially damaged portions (left side in FIG. 1) connected to the anode side of the constant current source 8. This artificially damaged portion is an anode site. The electrons $e^{e-}$ which have flowed into the steel sheet 2 pass through the steel sheet 2 to the other artificially damaged portion (right side in FIG. 1) and is released to the aqueous electrolyte material 6 at the other artificially damaged portion. The other artificially damaged portion is a cathode site.

At the anode site, $e^{e-}$ is supplied. Thus, due to the same principle as the electric anticorrosion, corrosion of the coated metal material 1 does not proceed although Fe of the steel plate 2 is ionized and then dissolved in the aqueous electrolyte material ($Fe \rightarrow Fe^{2+} + 2e^{e-}$).

On the other hand, at the cathode site, electrons are transferred from the anode site. Water, dissolved oxygen, and electrons $e^{e-}$ in the aqueous electrolyte material 6 thus react with each other to generate $OH^-$ ($H_2O + \frac{1}{2}O_2 + 2e^- \rightarrow 2OH^-$). Further, hydrogen ions generated by ionization and electrons $e^-$ in the aqueous electrolyte material 6 react with each other to generate hydrogen ($2H^+ + 2e^- \rightarrow H_2$). $OH^-$ and hydrogen are generated by cathode reaction (reduction). Further, hydrogen is also generated by electrolysis of water.

At the cathode site, the chemical conversion coating 3 is dissolved, and corrosion of the steel plate 2 proceeds by alkalization (generation of $OH^-$), and corrosion of the steel plate 2 proceeds (generation of hydrated iron oxide.) Thus, adhesion of the electrodeposition coating film 4 to the steel plate 2 is reduced. The generation of the hydrogen gas causes expansion of the electrodeposition coating film 4, and the corrosion of the steel plate 2 proceeds from the sites at the artificially damaged portions 5 to the periphery thereof.

With this current supply through the external circuit 7, voltage is applied to the aqueous electrolyte material 6 at the cathode site. Thus, cations (Nat and the like) in the aqueous electrolyte material 6 are transferred toward the steel plate 2 through the electrodeposition coating film 4. Water drawn by these cations then permeates into the electrodeposition coating film 4. At the anode site, anions ($Cl^-$ and the like) in the aqueous electrolyte material 6 are transferred toward the steel plate 2 through the electrodeposition coating film 4. Water drawn by these anions then permeates into the electrodeposition coating film 4.

In particular, in the above embodiment, perforated electrodes 12 are disposed to surround the respective artificially damaged portions 5. Thus, voltage is applied to the electrodeposition coating film 4 around the artificially damaged portions 5 in a stable manner, so that the ions are efficiently transferred to the electrodeposition coating film 4, and water efficiently permeates into the electrodeposition coating film 4. In addition, hydrogen gas is generated in the artificially damaged portion 5 at the cathode site as described above, and this hydrogen gas passes through the through hole 12a of the perforated electrode 12. Thus, deterioration of current supply performance can be avoided.

Further, the aqueous electrolyte material 6 is a muddy material containing a clay mineral. Thus, water and ions easily permeate into the electrodeposition coating film 4 around the artificially damaged portions 5.

Permeation of water and ions into the electrodeposition coating film 4 around the artificially damaged portions 5 at the anode site and the cathode site is accelerated by the current supply in this manner, so that the flow state of electricity can be rapidly stable. Accordingly, progression of corrosion from the artificially damaged portion 5 at the cathode site toward the periphery thereof becomes stable.

(Corrosion Resistance Evaluation Steps)

As described above, the progression of corrosion at the cathode site appears as the progression of the expansion of the electrodeposition coating film 4, i.e., the increase in expanded area of the coating film. Accordingly, by observing the degree of the spread of this coating film expansion at the elapse of the predetermined time from the start of current supply, the corrosion resistance of the sample can be evaluated.

The degree of the spread of the coating film expansion can be known by adhering an adhesive tape to the electrodeposition coating film 4 after the corrosion resistance test, peeling an expanding portion of the electrodeposition coating film 4, and measuring a diameter (hereinafter referred to as the "peeling diameter") of the exposed surface of the steel plate 2.

The time of the corrosion resistance test for observing the spread of the coating film expansion may be, for example, from 0.5 hours to 24 hours. The time is, preferably from 1 hour to 10 hours, more preferably from 1 hour to 5 hours.

In a case of evaluating the corrosion resistance of a sample in relation to the actual corrosion test (salt water spray test), a relationship between the corrosion progression rate in the present corrosion resistance test (an increase in diameter due to spread of the coating film expansion per unit time) and the corrosion resistance rate in the actual corrosion test is determined in advance, which makes it possible to predict how much degree of corrosion resistance in the actual corrosion test the corrosion resistance of the sample could be corresponding to.

EXAMPLE

Corrosion Resistance Test

Six kinds of samples (coated metal materials) which were different from each other in terms of the time for chemical conversion treatment with zinc phosphate and the baking conditions for electrodeposition coating, shown in FIGS. 2 and 3 were prepared. In each of the samples 1 to 6, the metal base was a steel plate 2, and the electrodeposition coating film 4 had a thickness of 10 μm. Each sample was subjected to the present corrosion resistance test in an aspect shown in FIG. 1.

Two quadrangular artificially damaged portions 5 each with a diagonal length of 1 mm (each exposed area of the steel plate 2: 0.54 mm$^2$) reaching the steel plate were quantitatively formed using a Vickers hardness tester having an indenter with a quadrangular tip, i.e., formed by applying a load (test strength) of 30 kg such that the artificially damaged portions 5 are spaced 4 cm from each other.

Since the area of the bottom surface of the quadrangular pyramid with a diagonal length of 1 mm was 0.5 mm$^2$, the opening area of each artificially damaged portion 5 opened to the surface of each sample was 0.5 mm$^2$ corresponding to the area of the bottom surface. On the other hand, the exposed surface of the steel sheet 2 formed by each quadrangular artificially damaged portion 5 became a conical surface, and therefore, the exposed area of the steel sheet 2 was 0.54 mm$^2$, which was larger than the opening area.

As an aqueous electrolyte material 6, a dilution obtained by diluting pseudo mud having pH 7 with a 5% saline solution (sodium chloride) to have 20% was used. The composition ratio of the pseudo mud is water:kaolinite:sodium chloride:sodium sulfate:calcium chloride=500:500:25:25:25 (by mass).

As the electrodes 12, a ring-shaped perforated electrodes (made of platinum) each with an outer diameter of about 32 mm and an inner diameter of about 30 mm were used.

Current was supplied for 5 hours under an environment at 50° C. through a constant current source 8 set at 1 mmA.

FIGS. 2 and 3 show results of the present corrosion resistance test (appearances of the anode site, appearances of the cathode site before and after peeling, corrosion progression rates (spreading rates of coating film expansion), and the corrosion progression rates in the actual corrosion test (test in which pseudo mud was adhered to the artificial gushes and was then exposed to an environment at a temperature of 50° C. and humidity of 98%)).

With reference to the samples 1, 4, and 6 with time for chemical conversion treatment of 120 seconds shown in FIGS. 2 and 3, the corrosion progression rate in the corrosion resistance test was lower (i.e., an increase in diameter due to spread of expansion was smaller) as the baking conditions of the electrodeposition coating film 4 became better (i.e., the baking temperature became higher or the baking time became longer), i.e., as the film quality of the electrodeposition coating film 4 became better. That is, the corrosion progression rate corresponds to the film quality of the electrodeposition coating film 4.

With reference to the samples 5 and 6 with baking conditions for the electrodeposition coating film 4 at 150° C.×20 minutes, the corrosion progression rates of the present corrosion resistance test was lower (i.e., an increase in diameter due to spread of expansion is smaller) in the sample 6 with a longer time for chemical conversion treatment. That is, the corrosion progression rate corresponds to the quality of the chemical conversion coating.

With reference to the samples 2, 3, and 4 with baking conditions for the electrodeposition coating film 4 at 140×20 minutes, the corrosion progression rate of the sample 3 with time for chemical conversion treatment of 30 seconds was lower than that of the sample 4 with time for chemical conversion treatment of 120 seconds. The corrosion progression rate in the actual corrosion test of the sample 3 was also lower than that of the sample 4. Thus, it was considered that there was no problem in the present corrosion resistance test, and the film quality of the electrodeposition coating film 4 or the chemical conversion coating 3 in the sample 3 was higher than that of the sample 4 for some reasons.

Figure 4:
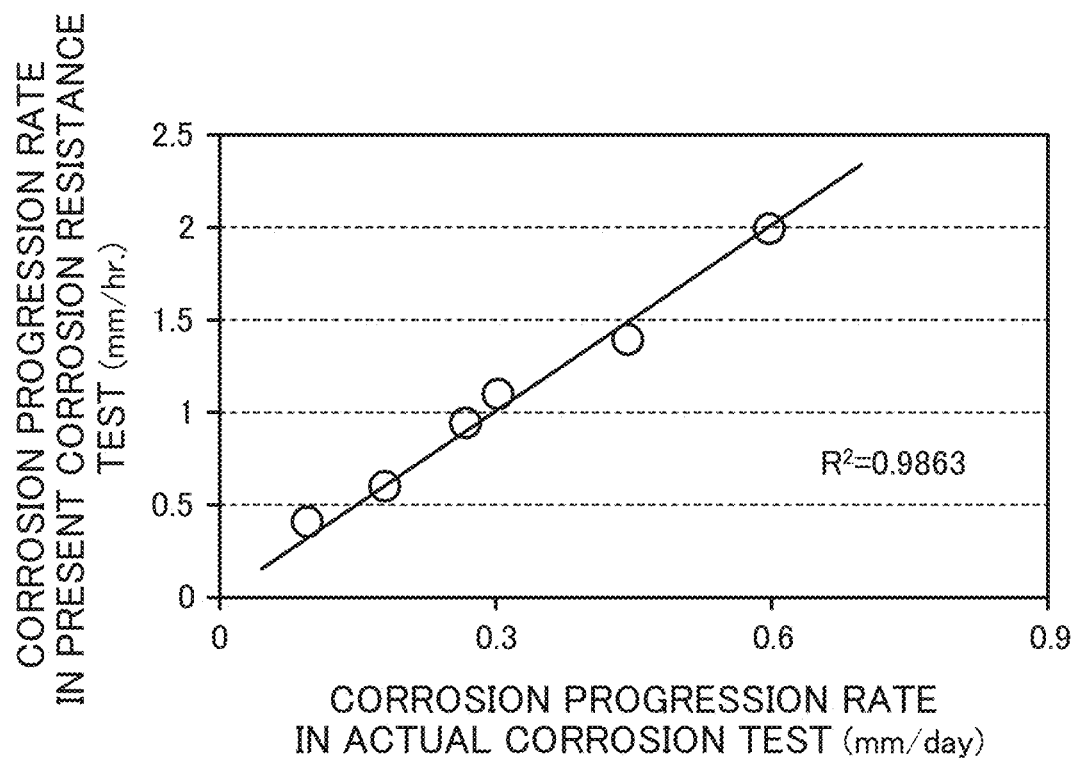
FIG. 4 is a graph illustrating a correlation between the corrosion progression rate in the present corrosion resistance test and the corrosion progression rate according to the actual corrosion test.

As illustrated in FIG. 4, it was understood that the correlation between the corrosion progression rate in the present corrosion resistance test and the corrosion progression rate in the actual corrosion test in each of the samples 1 to 6 was strong ($R^2$=0.9863). It is thus demonstrated that the measurement of the corrosion progression rate by the present corrosion resistance test allows the corrosion resistance of the coated metal material 1 to be evaluated in a comparable manner to the actual corrosion test.

Water Absorption Acceleration Properties of Coating Film by Aqueous Electrolyte Material Various kinds of deposits were placed on the surfaces of various kinds of electrodeposition coating films 4 different from each other in terms of the baking conditions or the thicknesses so as to examine the amount of water absorbed in the electrodeposition coating film 4 and the expansion occurrence rate of the electrodeposition coating film 4 after the elapse of nine days. As illustrated in FIGS. 5 to 7, the kinds and forms of the deposits include five kinds of "water", "5% NaCl (spray)", "5% CaCl (spray)", the "pseudo mud", and "5% NaCl (immersion)."

FIG. 5 indicates that the amount of water absorbed was small, and coating film expansion was barely observed even after the elapse of nine days in each of the cases of the water, the 5% NaCl (spray), and the 5% CaCl (spray).

In contrast, FIG. 6 indicates that the amount of water absorbed and the expansion occurrence rate after the elapse of nine days were considerably large in the case of the pseudo mud compared with the cases of water, the 5% NaCl (spray), and the 5% CaCl (spray). In particular, comparing the cases with the same baking conditions for the electrodeposition coating film 4 at 150×20 minutes, it was understood that the amount of water absorbed and the expansion occurrence rate were remarkably large in the case of the pseudo mud.

FIG. 7 indicates that the amount of water absorbed and the expansion occurrence rate were high in the case of 5% NaCl (immersion) compared with the cases of the water, the 5% CaCl (spray), and the 5% CaCl (spray) but was considerably low compared with the case of the standard mud of FIG. 6.

Figure 8:
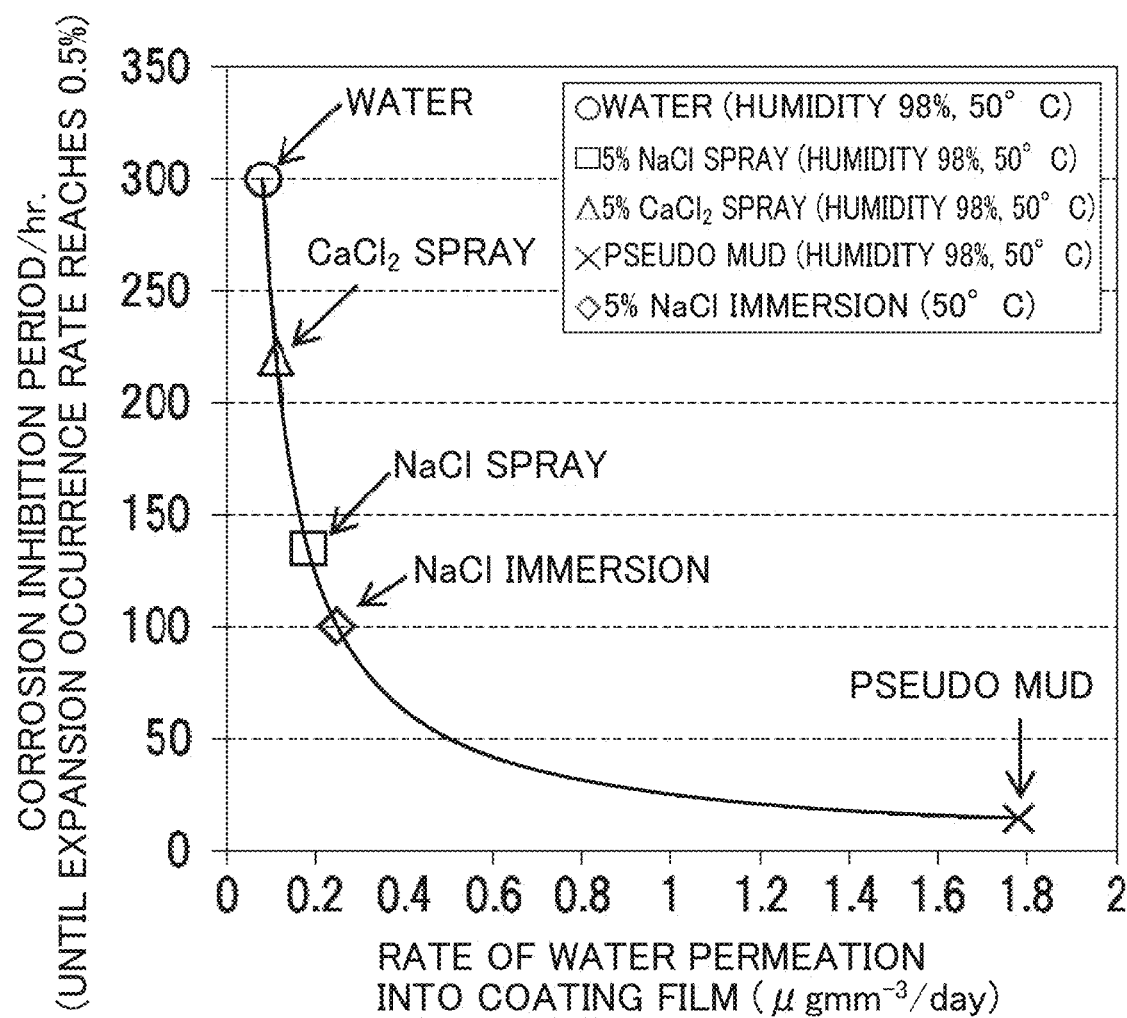
FIG. 8 is a graph showing the relationship between the corrosion inhibition period and the rate of water permeation into each coating film according to each deposit on the coating film.

FIG. 8 shows results of the corrosion inhibition period and the rate of water permeation into each coating film in the above-described five kinds with the same baking conditions at 150×20 minutes for the electrodeposition coating film 4. The time until the expansion occurrence rate reaches 0.5% was defined as the corrosion inhibition period. The rate of water permeation into the coating film was calculated on the basis of the time until the amount of water absorbed in the coating film reached 25 μg/mm$^3$. FIG. 7 indicates that the corrosion inhibition period was short, i.e., the rate of water permeation into the coating film was considerably large in the case of the pseudo mud compared with the saline solution spray.

The above-described results demonstrate that if pseudo mud is employed as the aqueous electrolyte material 6, water quickly permeates into the coating film, and the corrosion resistance test by the above-mentioned electrochemical technique can be conducted rapidly and stably.

Control of Current Supply

In the corrosion resistance test according to the present embodiment, a technique for supplying current to the metal base (steel plate) 2 is not limited to constant current control and may be constant voltage control.

Figure 9:
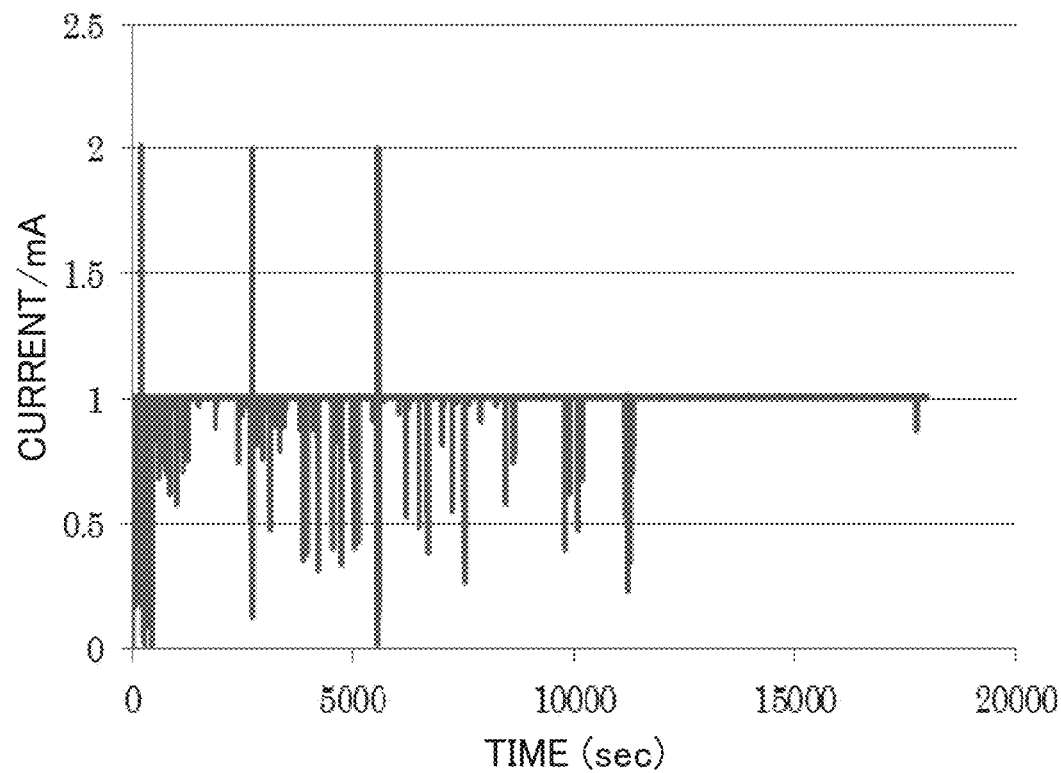
FIG. 9 is a plot of current under constant current supply control in the corrosion resistance test according to the embodiment.
Figure 10:
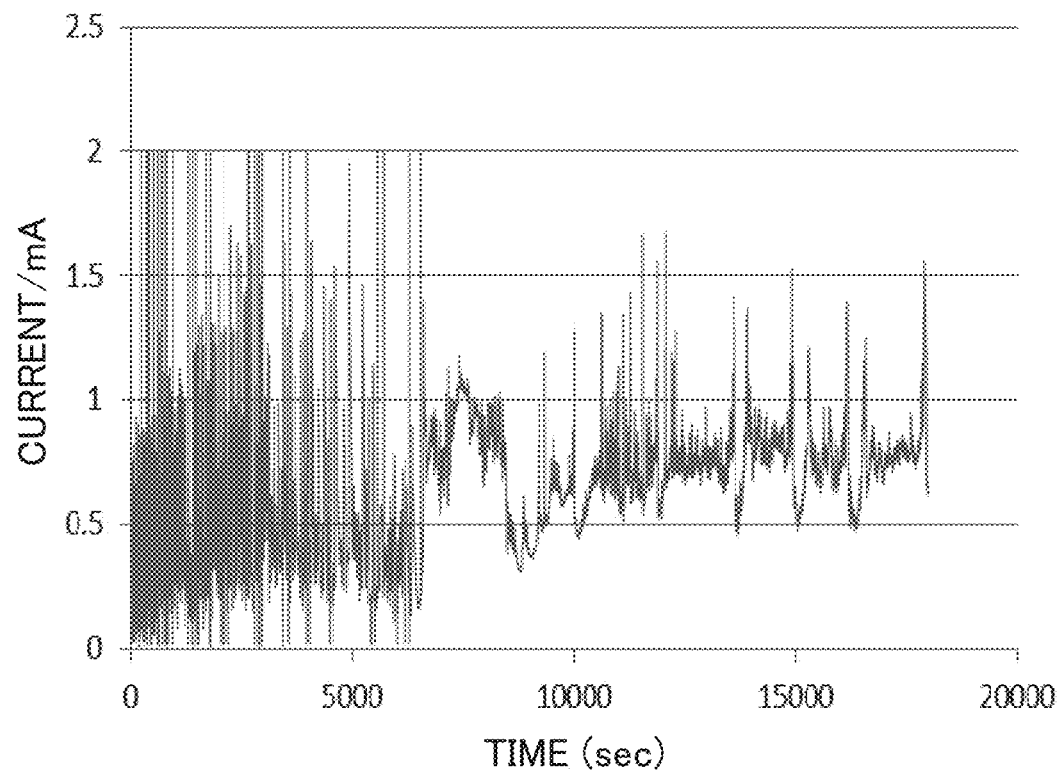
FIG. 10 is a plot of voltage under constant voltage supply control in the corrosion resistance test according to the embodiment.

FIG. 9 is a plot of current supplied under the constant current control. FIG. 10 is a plot of current at the time when a constant voltage at which a current of about 1 mA flows is applied. In the corrosion resistance tests under the constant current control and under the constant voltage control, the test conditions other than the conditions of current supply were the same.

Under the constant current control, current values varied at the beginning of current supply but were controlled to be approximately 1 mA. Such a stabilized value of the current directly involved in the acceleration of corrosion improves the accelerated reproducibility of corrosion. That is, the corrosion resistance test becomes highly reliable.

In contrast, under the constant voltage control, it was found that current values varied greatly, which was disadvantageous in accelerated reproducibility of corrosion. It is considered that the period from the beginning of current supply to around 7000 seconds in which the current value greatly vary corresponds to the period for permeating water into the electrodeposition coating film 4, and water thus does not steadily permeate into the coating film, thereby greatly varying the current value. After the period, the current value still varied within the range from 0.5 mA to 1.5 mA. This may be caused by the influence of the variation in the resistance value due to the deterioration and rusting of the chemical conversion coating.

From the plot of current (waveform of current) under the constant voltage control, the proceeding state of corrosion or the degree of corrosion can be determined.

DESCRIPTION OF REFERENCE CHARACTERS

1 Coated Metal Material
2 Steel Plate (Metal Base)
3 Chemical Conversion Coating
4 Electrodeposition Coating Film (Surface Treatment Film)
5 Artificially damaged portion
6 Aqueous Electrolyte Material
7 External Circuit
8 Constant Current Source (Current Supplier)
12 Electrode (Perforated Electrode)
12a Through Hole

The invention claimed is:

1. A method for a corrosion resistance test of a coated metal material obtained by providing a metal base with a surface treatment film, the method comprising:
   forming two artificially damaged portions penetrating the surface treatment film to the metal base in the coated metal material so as to be spaced from each other;
   electrically connecting the artificially damaged portions to each other by an external circuit via an aqueous electrolyte material in contact with the artificially damaged portions, electrodes at both ends of the external circuit being buried in the aqueous electrolyte material; and
   supplying current to the metal base through the external circuit using one of the artificially damaged portions as an anode site and the other as a cathode site so as to proceed corrosion of the coated metal material.

2. The method of claim 1, wherein
the aqueous electrolyte material is a muddy material and is provided on faces of the surface treatment film at the respective artificially damaged portions.

3. The method of claim 1, wherein
an exposed area of the metal base by the artificially damaged portion at the cathode site at which a cathode reaction occurs is from 0.005 $mm^2$ to 25 $mm^2$.

4. The method of claim 3, wherein
a distance between the artificially damaged portions is 3 cm or more.

5. The method of claim 1, wherein
a value of current supplied by the external circuit is from 10 µA to 10 mA.

6. The method of claim 1, wherein
the surface treatment film is a resin coating film.

7. A corrosion resistance test apparatus for a coated metal material obtained by coating a metal base with a surface treatment film, the corrosion resistance test apparatus comprising:
   an external circuit that includes electrodes provided on both ends of the external circuit and buried in the aqueous electrolyte material and connects two artificially damaged portions penetrating the surface treatment film to the metal base, the artificially damaged portions being formed in the coated metal material so as to be spaced from each other via an aqueous electrolyte material in contact with the artificially damaged portions; and
   a current supplier that supplies current to the metal base through the external circuit using one of the artificially damaged portions as an anode site and the other as a cathode site so as to proceed corrosion of the coated metal material.

8. The corrosion resistance test apparatus of claim 7, wherein
the aqueous electrolyte material is a muddy material and is provided on faces of the surface treatment film at the respective artificially damaged portions.

9. The corrosion resistance test apparatus of claim 7, wherein
an exposed area of the metal base by the artificially damaged portion at the cathode site at which a cathode reaction occurs is from 0.005 $mm^2$ to 25 $mm^2$.

10. The corrosion resistance test apparatus of claim 9, wherein
a distance between the artificially damaged portions is 3 cm or more.

11. The corrosion resistance test apparatus of claim 7, wherein
a value of current supplied by the external circuit is from 10 µA to 10 mA.

12. The corrosion resistance test apparatus of claim 7, wherein
the surface treatment film is a resin coating film.

13. The method of claim 1, wherein
the metal base is a single metal base.

14. The method of claim 1, wherein
the method further comprises evaluating the corrosion resistance of the coated metal material by observing the degree of the spread of the surface treatment film expansion at the cathode site at the elapse of the predetermined time from the start of current supply.

15. The method of claim 1, wherein
the aqueous electrolyte material contains a supporting electrolyte and a clay mineral,
the supporting electrolyte is at least one salt selected from sodium chloride, sodium sulfate, calcium chloride, calcium phosphate, potassium chloride, potassium nitrate, potassium hydrogen tartrate, and magnesium sulfate, and
the clay mineral is at least one selected from kaolinite, montmorillonite, sericite, illite, glauconite, chlorite, and talc.

16. The method of claim 1, wherein
by the current supply,
electrons e– flow from the aqueous electrolyte material to the metal base at one of the artificially damaged portions, the artificially damaged portion being the anode site, and
the electrons e– which have flowed into the metal base pass through the metal base to the other artificially damaged portion and are released to the aqueous electrolyte material at the other artificially damaged portion, the other artificially damaged portion being a cathode site.

17. The corrosion resistance test apparatus of claim 7, wherein
the metal base is a single metal base.

18. The method of claim 1, wherein
the aqueous electrolyte material contains a supporting electrolyte and a clay mineral,
the supporting electrolyte is at least one salt selected from sodium chloride, sodium sulfate, calcium chloride, calcium phosphate, potassium chloride, potassium nitrate, potassium hydrogen tartrate, and magnesium sulfate, and
the clay mineral is at least one selected from kaolinite, montmorillonite, sericite, illite, glauconite, chlorite, and talc.

19. The corrosion resistance test apparatus of claim 7, wherein
by the current supply,
electrons e– flow from the aqueous electrolyte material to the metal base at one of the artificially damaged portions, the artificially damaged portion being the anode site, and
the electrons e– which have flowed into the metal base pass through the metal base to the other artificially damaged portion and are released to the aqueous electrolyte material at the other artificially damaged portion, the other artificially damaged portion being a cathode site.

20. A method for a corrosion resistance test of a coated metal material obtained by providing a single metal base with a surface treatment film, the method comprising:
forming two artificially damaged portions penetrating the surface treatment film to the single metal base in the coated metal material so as to be spaced from each other;
electrically connecting the artificially damaged portions to each other by an external circuit via an aqueous electrolyte material in contact with the artificially damaged portions; and
supplying current to the single metal base through the external circuit using one of the artificially damaged portions as an anode site and the other as a cathode site provided on the same single metal base so as to proceed corrosion of the coated metal material.

\* \* \* \* \*